(12) United States Patent
Kathuria et al.

(10) Patent No.: US 7,676,481 B2
(45) Date of Patent: Mar. 9, 2010

(54) SERIALIZATION OF FILE SYSTEM ITEM(S) AND ASSOCIATED ENTITY(IES)

(75) Inventors: Vishal Kathuria, Woodinville, WA (US); Hanumantha Rao Kodavalla, Sammamish, WA (US); Martin J. Sleeman, Redmond, WA (US); Robin Dhananjay Dhamankar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 672 days.

(21) Appl. No.: 11/121,284

(22) Filed: May 3, 2005

(65) Prior Publication Data

US 2006/0190469 A1 Aug. 24, 2006

Related U.S. Application Data

(60) Provisional application No. 60/656,118, filed on Feb. 24, 2005.

(51) Int. Cl.
*G06F 17/00* (2006.01)
*G06F 17/30* (2006.01)

(52) U.S. Cl. .............. 707/101; 707/102; 707/104.1; 707/200

(58) Field of Classification Search ........... 707/101, 707/102, 103, 104
See application file for complete search history.

(56) References Cited

U.S. PATENT DOCUMENTS

| | | | |
|---|---|---|---|
| 5,832,274 A | | 11/1998 | Cutler et al. |
| 5,873,103 A | | 2/1999 | Trede et al. |
| 6,862,599 B2 | * | 3/2005 | King ............ 707/100 |
| 6,898,604 B1 | * | 5/2005 | Ballinger et al. ......... 707/101 |
| 6,961,712 B1 | * | 11/2005 | Perkowski .............. 705/27 |
| 7,120,639 B1 | * | 10/2006 | de Jong et al. .......... 707/101 |
| 7,120,863 B1 | * | 10/2006 | Wang ................... 715/513 |
| 7,136,865 B1 | * | 11/2006 | Ra et al. ................ 707/102 |
| 7,167,864 B1 | * | 1/2007 | Vasudevan .............. 707/10 |
| 7,167,920 B2 | * | 1/2007 | Traversat et al. ........ 709/230 |
| 2002/0078065 A1 | | 6/2002 | Agulhon |
| 2003/0088593 A1 | * | 5/2003 | Stickler ................ 707/205 |
| 2004/0177080 A1 | * | 9/2004 | Doise et al. ............ 707/100 |
| 2006/0117061 A1 | * | 6/2006 | Weiss ................. 707/104.1 |

OTHER PUBLICATIONS

An Evaluation of Binary XML Encoding Optimizations for Fast Stream Based XML Processing by Roberto J. Bayardo (IBM, 2004).*
Opyrchal, et al. "Efficient Object Serialization in Java" (1999) Proceedings of the 19th IEEE International Conference on Disturbed Computing Systems, pp. 96-101.

(Continued)

*Primary Examiner*—Pierre M Vital
*Assistant Examiner*—Loan T Nguyen
(74) *Attorney, Agent, or Firm*—Workman Nydegger

(57) ABSTRACT

A system and method for serialization and/or de-serialization of file system item(s) and associated entity(ies) is provided. A file system "item" comprises a core class which can include property(ies). Through serialization, a consistent copy of the item and associated entity(ies), such as fragment(s), link(s) with other item(s) and/or extension(s), if any, can be captured. The serialization system includes an identification component that identifies entity(ies) associated with an item and a serialization component that serializes the item and associated entity(ies). The serialization component can further serialize a header that includes information associated with the item and associated entity(ies). The header can facilitate random access to the item and associated entity(ies). The serialization system can expose application program interface(s) (API's) that facilitate the copying, moving and/or transfer of an item and its associated entity(ies) from one location to another location.

17 Claims, 12 Drawing Sheets

OTHER PUBLICATIONS

Riggs, et al. "Picking State in the Java System" (1996) Computing Systems, Usenix Association, vol. 9, No. 4, pp. 241-250.

Grimes. "Object Serialization in .NET" (2004) Dr. Dobb's Journal CMP Media, LLC vol. 29, No. 10, pp. S1-S7.

European Search Report dated Jul. 10, 2006 and mailed Jul. 14, 2006 for European Patent Application No. 06100436, 5 pages.

Extended European Search Report dated Dec. 22, 2006 and mailed Jan. 10, 2007 for European Patent Application No. 06100436, 12 pages.

* cited by examiner

SERIALIZATION OF FILE SYSTEM ITEM(S) AND ASSOCIATED ENTITY(IES)

REFERENCE TO RELATED APPLICATIONS

This application claims the benefit of U.S. Provisional Application Ser. No. 60/656,118 filed on Feb. 24, 2005, and entitled SERIALIZATION OF FILE SYSTEM ITEM(S) AND ASSOCIATED ENTITY(IES), the entirety of which is incorporated herein by reference.

TECHNICAL FIELD

The subject invention relates generally to object storage system(s) and, more particularly, to serialization and/or de-serialization of item(s) and associated entity(ies).

BACKGROUND OF THE INVENTION

Traditionally, in a computer file system, a file is the basic unit of data storage. Typically, a file in a file system has the following characteristics. It is a single sequence of bytes. It has a finite length and is stored typically in a non-volatile storage medium. It is created in a directory and has a name that it can be referred to by in file operations, possibly in combination with its path. Additionally, a file system may associate other information with a file, such as permission bits or other file attributes; timestamps for file creation, last revision, and last access etc. Specific applications can also store domain-specific properties in the byte stream of the file. For example, files that are used by a word processing application and hence considered as 'documents' may store properties like the Title and Author of the document. These properties are stored within the byte stream of the file in a format that is specific to the application creating the file. The properties are not structured as objects, nor do they have standardized names. The byte streams are unstructured values.

Additionally, conventional computer file systems have provided limited file organization techniques available to users. For example, existing applications have largely adopted a tree structure folder format for organizing and displaying various types of files. Though some relationships between folders, subfolders, and files can be viewed, such relationships are limited in scope and are primarily dependent upon explicit user input. For example, files can be related according to their common folder or subfolder as denoted by the user.

SUMMARY OF THE INVENTION

The following presents a simplified summary of the subject invention in order to provide a basic understanding of some aspects of the subject invention. This summary is not an extensive overview of the subject invention. It is not intended to identify key/critical elements of the subject invention or to delineate the scope of the subject invention. Its sole purpose is to present some concepts of the subject invention in a simplified form as a prelude to the more detailed description that is presented later.

The subject invention provides for serialization and/or de-serialization of file system item(s) and associated entity(ies). A file system "item" comprises a core class, for example, a contact, which can include property(ies). An item can be simple or compound (e.g., includes other item(s) embedded in it). Associated with an item can be entity(ies) such as fragment(s), link(s) with other item(s) and/or extension(s). Through serialization, a consistent copy of the item and associated entity(ies), if any, can be captured (e.g., for transporting of the item and to reconstruct the item on a destination system).

In accordance with an aspect of the subject invention, a serialization system is provided. The serialization system includes an identification component that identities entity(ies) associated with an item a serialization component that serializes the item and associated entity(ies). The serialization component can further serialize a header that includes information associated with the item and associated entity(ies). The header can facilitate random access to the item and associated entity(ies) (e.g., allowing a reader to interpret/parse only the parts in which it is interested). Optionally, the serialization system can expose application program interface(s) (API's) that facilitate the copying, moving and/or transfer of an item and its associated entity(ies) from one location to another location (e.g., separate computer system and/or removable media).

Another aspect of the subject invention provides for an item de-serialization system which can be employed to de-serialize an item and it's associated entity(ies). The de-serialization system can employ a header to gain random access to the item and associated entity(ies) (e.g., can interpret/parse only the parts in which it is interested). The de-serialization system can re-create the item structure in a file system store.

To the accomplishment of the foregoing and related ends, certain illustrative aspects of the subject invention are described herein in connection with the following description and the annexed drawings. These aspects are indicative, however, of but a few of the various ways in which the principles of the subject invention may be employed and the subject invention is intended to include all such aspects and their equivalents. Other advantages and novel features of the subject invention may become apparent from the following detailed description of the subject invention when considered in conjunction with the drawings.

DETAILED DESCRIPTION OF THE INVENTION

Figure 1:
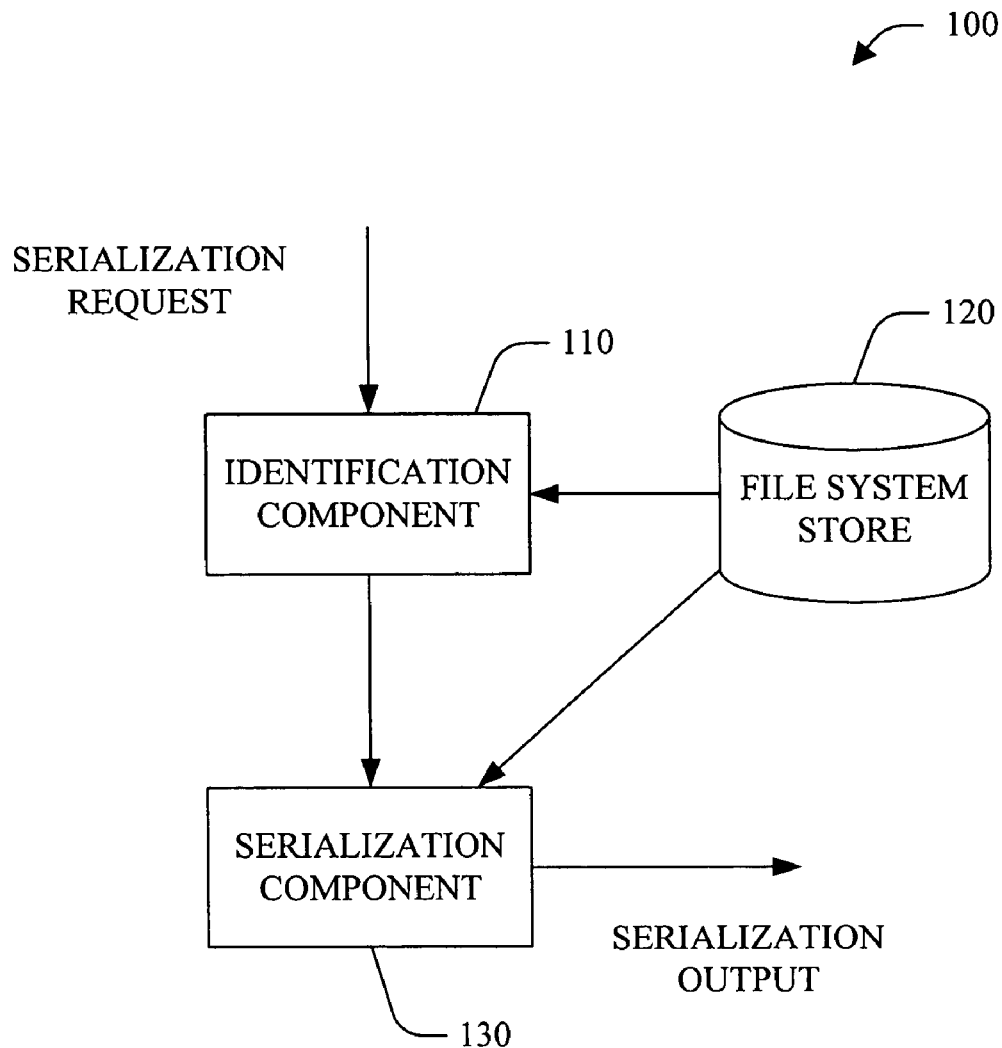
FIG. 1 is a block diagram a serialization system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the subject invention.

The subject invention provides for serialization and/or de-serialization of file system item(s) and associated entity(ies). As used in this application, a file system "item" comprises a core class, for example, a contact, which can include property(ies) (e.g., name, address, telephone number). An item can be simple or compound (e.g., includes other item(s) embedded in it). Associated with an item can be entity(ies) such as item fragment(s), link(s) with other item(s) (e.g., relationship(s)) and/or extension(s) (e.g., additional property(ies)).

Referring to FIG. 1, a serialization system 100 in accordance with an aspect of the subject invention is illustrated. The system 100 can be employed to serialize an item (e.g., core item) and entity(ies) associated with the item. The system 100 can further generate and serialize a header that includes information associated with the item and associated entity(ies).

The serialization system 100 includes an identification component 110 that identities entity(ies) associated with an item. The identification component 110 can obtain information regarding the item from a file system store 120. As discussed below, the information can include, for example, item fragment(s), extension(s), outgoing link(s), incoming link(s) and/or embedded item(s).

The serialization system 100 further includes a serialization component 130 that serializes the item and associated entity(ies). The serialization component 130 can further generate and serialize a header that includes information associated with the item and associated entity(ies). The header can facilitate random access to the item and associated entity(ies) (e.g., allowing a reader to interpret/parse only the parts in which it is interested).

Figure 2:
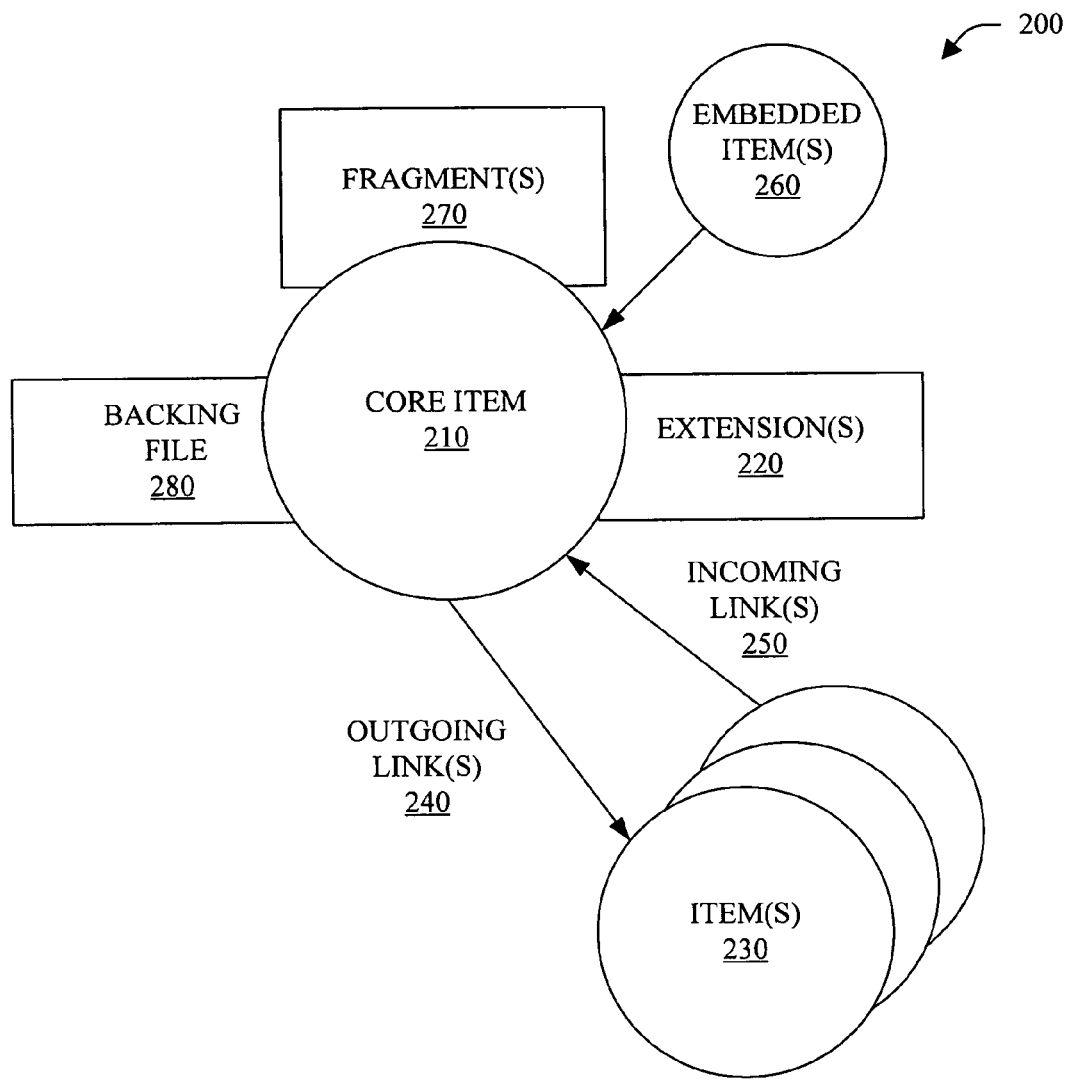
FIG. 2 is a diagram of an exemplary item structure in accordance with an aspect of the subject invention.

Referring briefly to FIG. 2, an exemplary item structure diagram 200 in accordance with an aspect of the subject invention is illustrated. In this example, a core item 210 can include property(ies). For example, a core item 210 can be a "contact" with properties of "name" and "home telephone number".

The core item 210 can have extension(s) 220 added by particular application(s), to extend the core item 210 with extra property(ies). Continuing with the "contact" core item 210 example, an e-mail application can extend the property(ies) of the core item 210 by adding extension properties "e-mail address" and "business telephone number".

Next, the core item 210 can be linked to zero, one or more other item(s) 230. The link can be an outgoing link(s) 240 and/or an incoming link(s) 250. Outgoing link(s) 240 refer to a coupling between the core item 210 and the other item(s) 230 with the core item 210 as the source. Incoming link(s) 250 refer to a coupling between the core item 210 and the item(s) 230 with other item(s) 230 as the source. Outgoing link(s) 240 and/or incoming link(s) 250 can be typed. Links 240, 250 thus provide relational power for coupling of items. For example, a link 240, 250 can be of type "friend" which has associated properties of "date of friendship" and "rating". Additionally, links 240, 250 can uniquely identify (e.g., using a globally unique identifier) a coupling between items.

The core item 210 can further include embedded item(s) 260, sometimes referred to collectively herein as a compound item. For example, a core item 210 of type "contact" can include an embedded item 260 comprising an image (e.g., photograph). In accordance with an aspect of the subject invention, a compound item can be viewed as a single unit of consistency by item-level operations (e.g., backup, restore, copy and/or export).

The core item 210 can have fragment(s) 270 which are entity types that enable declaration of large collections in items types and item extensions. The elements of the collection are entities that have keys. This enables applications to access and modify elements in the collection independently of the owning item. The owning item does not have to be retrieved in order for the collection to be modified. Additionally the system can track changes of each element in the nested extent.

A core item 210 can be backed up by a file or may have FileStream properties. A file backed item is an item where a part of the item is promoted out of a backing file 280.

The extension(s) 220, outgoing link(s) 240, information associated with incoming link(s) 250 (e.g., link identifier(s)), embedded item(s) 260, fragment(s) 270 and/or backing file 280 can be collectively referred to as "associated entity(ies)" of the core item 210. When a request to serialize a core item 210 is received, the core item 210 and associated entity(ies), if any, are copied in order to preserve the structural integrity of the core item 210. By including the associated entity(ies), a system (not shown) receiving the serialization stream can re-constitute the core item 210 and associated entity(ies) in their appropriate context.

The diagram 200 illustrates elements of an exemplary item structure which can be employed with the serialization system 100. Those skilled in the art will recognize that the subject invention is not limited to the item structure set forth in FIG. 2. Any suitable item structure for carrying out the subject invention can be employed and all such item structures are intended to fall within the scope of the hereto appended claims.

Referring to FIGS. 1 and 2, the system 100 can be employed to serialize (e.g., for transport to another computer system) a core item 210 and associated entity(ies) of the core item 210 (e.g., extension(s) 220, outgoing link(s) 240, information associated with incoming link(s) 250 (e.g., link identifier(s)), embedded item(s) 260 and/or fragment(s) 270). The identification component 110 identifies the core item 210 within the file system store 120 and provides identification information to the serialization component 130. The identification component 110 further identifies entity(ies) associated with the core item 210 and provides identification information related to the associated entity(ies) to the serialization component 130.

The serialization component 130 can allocate space (e.g., temporarily) for a header which is populated during serialization. In this example, the serialization component 130 performs the following:
1. Allocates space for a header;
2. Serializes the core item 210;
3. Serializes item fragment(s) 270, if any;
4. Serializes the outgoing link(s) 240, if any;
5. Populates the header with the incoming link identifier(s), if any;
6. Serializes the extension(s) 220, if any;
7. For each embedded item 260, acts 1 through 8 are repeated recursively with the particular embedded item serving as the core item 210;
8. Serializes the backing file, if any;
9. The serialization length, header offset and the header itself.

Figure 3:
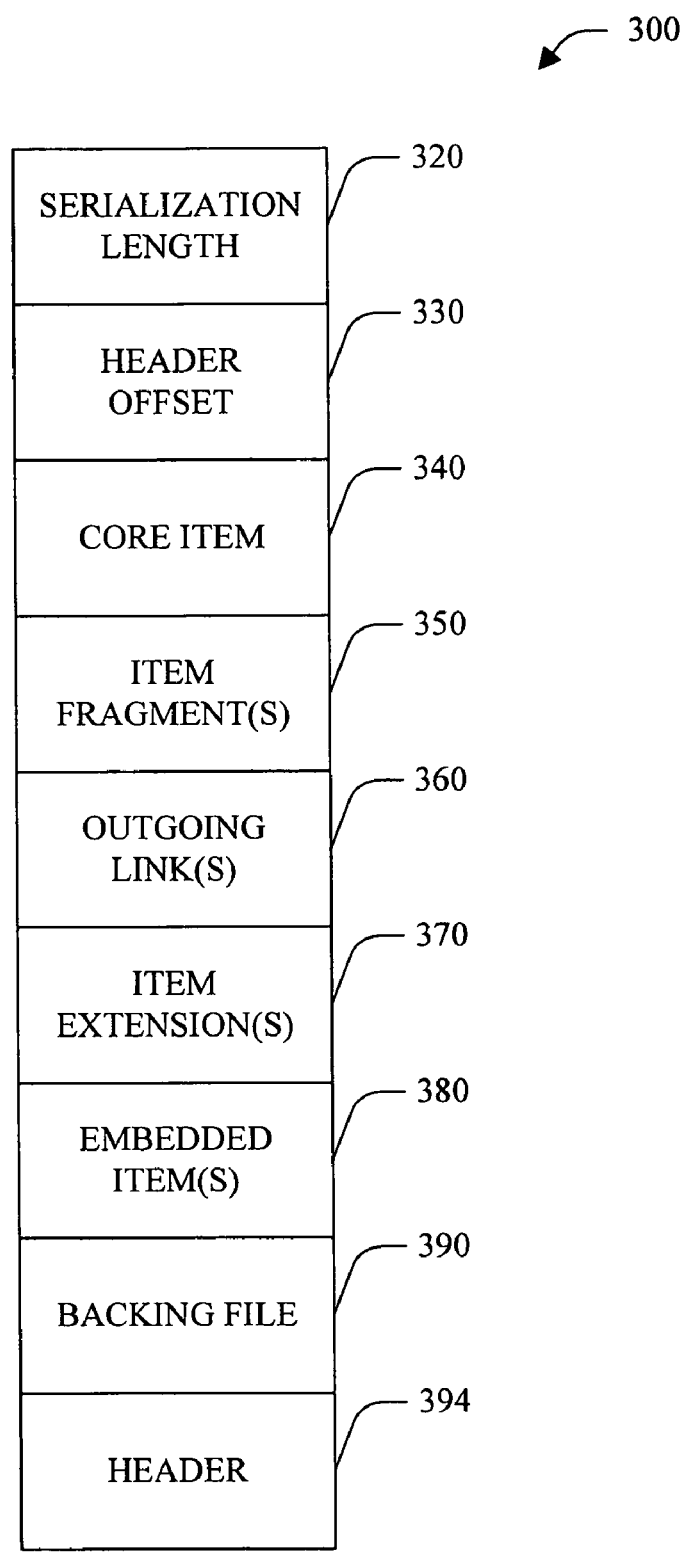
FIG. 3 is a diagram of an exemplary serialization structure in accordance with an aspect of the subject invention.

Turning to FIG. 3, an exemplary serialization structure 300 in accordance with an aspect of the subject invention is illustrated. The structure 300 can be generated, for example, by the serialization component 130, for example:

TABLE 1

```
public class UdtSerialization
{
    BinaryUdtSerialization bin;
}
```

The structure 300 includes a serialization length 320 and a header offset 330, for example:

TABLE 2

```
public class BinaryUdtSerialization
{
    // The offset of the serialization in the stream
    long serializationOffset;
    // The length of the serialization
    long serializationLength;
}
```

The class set forth in Table 2 is used to support the metadata that is employed to interpret the binary serialization of the user-defined type (UDT).

Next, the structure 300 includes a core item section 340:

TABLE 3

```
public class CoreItem : UdtSerialization
{
// Item id of the root item
SqlGuid itemId;
// Item id of the container
SqlGuid containerId;
// namespacename of the item
```

TABLE 3-continued

```
SqlString namespaceName;
// Is this a file backed item?
bool isFileBacked;
// If the backing file is inlined, then the offset of the backing file
long backingFileOffset;
// Length of the backing file
long backingFileLength;
//Stores the attributes of the file backed item
System.IO.FileAttributes fatFileAttributes;
// Creation time of the backing file
DateTime fileCreationTime;
// Last Write time of the backing file
DateTime fileLastWriteTime;
// Last Access time of the backing file
DateTime fileLastAccessTime;
// Offset of the security descriptor in the serialization
long sdOffset;
// Length of the security descriptor in the serialization
long sdLength;
// Offset of the start of the serialization of the item fragments
long itemFragmentOffset;
// Number of item fragments contained in the serialization
long itemFragmentCount;
}
```

The structure 300 further includes an item fragment(s) section 350, for example:

TABLE 4

```
public class ItemFragmentHeader : UdtSerialization
{
    // Fragment Id of the itemfragment
    private SqlGuid fragId;
    //Set id of the fragment
    private SqlGuid setId;
}
```

Next, the structure 300 can include an outgoing link(s) section 360, for example:

TABLE 5

```
public class LinkHeader : UdtSerialization
{
    SqlGuid sourceItemId;
    SqlGuid targetItemId;
    SqlGuid linkId;
    private bool excludesSchemaMetadata
}
```

While the link object generally has the information such as source and target item identifiers, the information is duplicated in the LinkHeader in the event that at the target the schema of the link type is absent and the link cannot be de-serialized.

Continuing, the structure 300 can include an item extension(s) section 370:

TABLE 6

```
public class ItemExtensionHeader : UdtSerialization
{
}
```

The structure 300 can include an embedded item(s) section 380:

TABLE 7

```
public class EmbeddedItem
{
    // Header of the embedded item
    ItemHeader itemHeader;
}
``` with

TABLE 8

```
public class ItemHeader
{
// Core Item Header
CoreItem coreItem;
// A list of Link headers that contain all the outgoing links for this item.
ArrayList outLinks;
// A list of extension headers for the extensions of this item
ArrayList extensions;
// A list of Embedded Item headers
ArrayList embeddedItems;
// A list of ids of incoming links of this item
ArrayList inLinkIds;
// Information about the backing file
private BackingFileHeader backingFileHeader;
// whether the serialization excludes schema meta data
bool excludesSchemaMetadata;
// Offset of the security descriptor in the serialization
long sdOffset;
// Length of the security descriptor in the serialization
long sdLength;
}
```

Next, the structure 300 can include a backing file section 390:

TABLE 9

```
public class BackingFileHeader
{
    // If the backing file is inlined, then the offset of the backing file
    private long backingFileOffset;
    // Length of the backing file
    private long backingFileLength;
    //Stores the attributes of the file backed item
    private System.IO.FileAttributes fatFileAttributes;
    // Creation time of the backing file
    private DateTime fileCreationTime;
    // Last Write time of the backing file
    private DateTime fileLastWriteTime;
    // Last Access time of the backing file
    private DateTime fileLastAccessTime;
}
```

Finally, the structure 300 can include a header section 394. The header section 394 can include information associated with the core item and associated entity(ies). The header section 394 can facilitate random access to the core item and associated entity(ies) (e.g., allowing a reader to interpret/parse only the parts in which it is interested).

Figure 4:
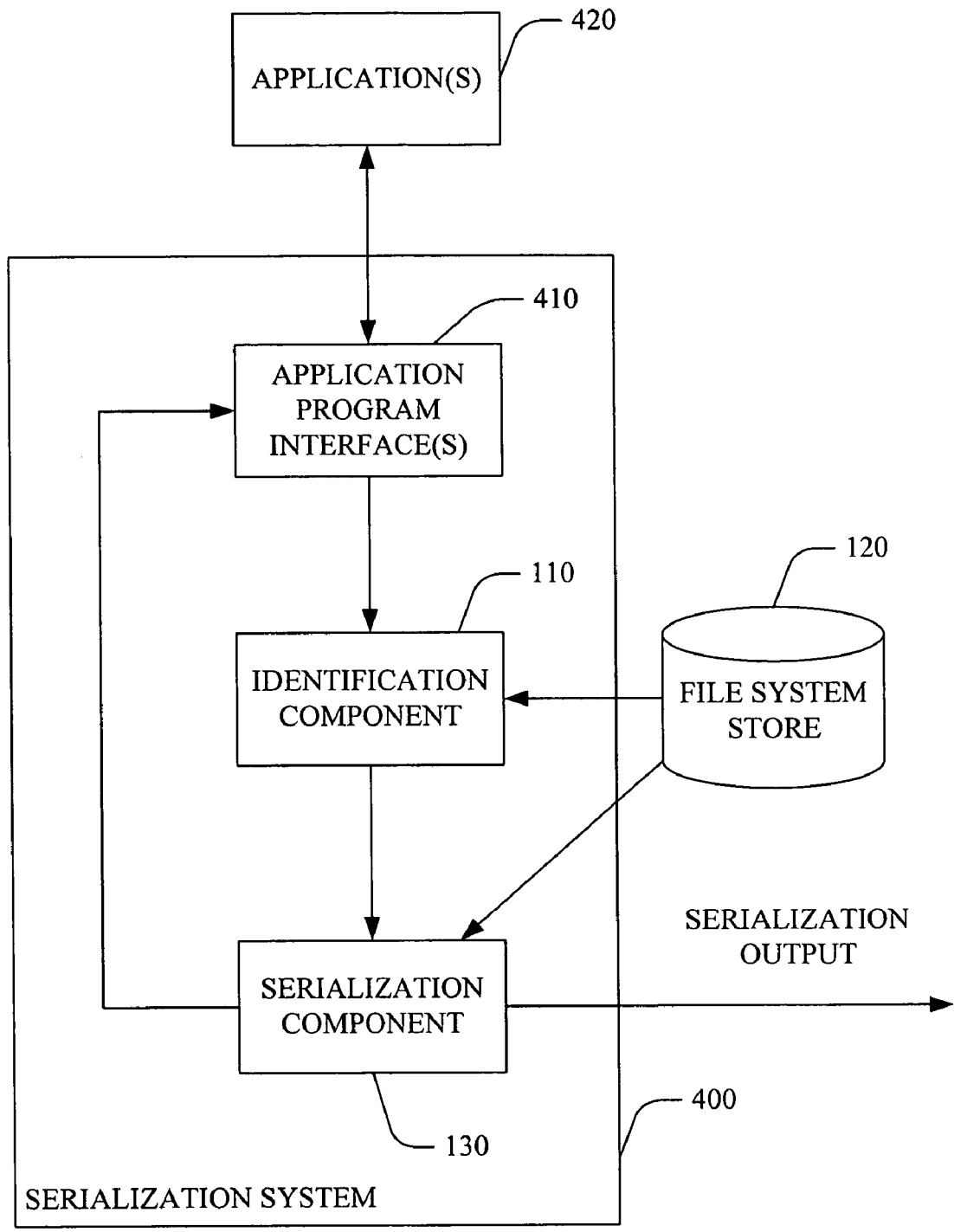
FIG. 4 is a block diagram of a serialization system in accordance with an aspect of the subject invention.

Turning next to FIG. 4, a serialization system 400 in accordance with an aspect of the subject invention is illustrated. The serialization system 400 includes an identification component 110 and a serialization component 130, as discussed above. The system 400 further includes application program interface(s) (APIs) 410. The APIs 410 facilitate communication between the system 400 and application(s) 420. For example, the APIs 410 can facilitate copying, moving and/or transfer of an item and its associated entity(ies) from one location to another location (e.g., separate computer system and/or removable media). Thus, the APIs 410 can be employed for item level operations such as Export, Backup, Restore, Copy, etc. In one example, the application 420 can selectively include all or part(s) of an item by providing serialization information (e.g., flag(s)) to the API 410. The APIs 410 can be exposed at the file system level and/or at the store procedure level. Exemplary APIs 410 are discussed below:

Serialize Item API

The serialize item API generates an item serialization that includes the following components, if they exist:
Core Item
Outgoing Links (Links for which the item being serialized is a source item) and Link identifier(s) of Incoming links (Links for which the item being serialized is a target item)
Items in the compound item
Extensions
Item Fragments
Local Creation time and Modification time for the entity (ies).

For example, a call to the serialize item API can be of the form:

```
[System.Storage.Serialization].SerializeItem (
@itemid uniqueidentifier,
@dataoptions int)
returns varbinary (max)
``` where itemid is the identifier of the item to be serialized; dataoptions refers to Serialize Data Options—options used to customize the contents of the serializations, as discussed below; and, the API returns the serialization of the item in a byte array.

Serialize Item to File

In case an item is quite large, it can be inefficient to serialize the item in memory and return the serialization to the client application. For such scenarios, a serialize item to file API can be employed that writes the serialization directly to the file specified by the application. This can limit the memory consumed by the serialization, at both the client application and the server side. Additionally, the API can lead to better performance because much smaller number of bytes need to be sent from the server to the client application. For example, a call to the serialize item to file can be of the form:

```
[System.Storage.Serialization].SerializeItemToFile (
@itemid uniqueidentifier,
@dataoptions int,
@filename nvarchar (1024)
)
returns bigint
``` where itemid is the identifier of the item to be serialized; data options: refers to Serialize Data Options—options used to customize the contents of the serializations, as discussed below; filename is the name of the file to which the object is to be serialized; and, the API returns the number of bytes written to the file.

Serialization Data Options

The options value allows the serialize function to satisfy the requirement of various customer scenarios. These options can be used to select the data/metadata elements related to the item that should be included as a part of the serialization. These options can affect the content of the serialization.

In this example, the value of the options can be specified as an OR combination of
- None or one of the common use cases and
- None, one or more options from amongst the individual options.

Individual Options

These options define the item boundary for individual scenarios. For example:

INCLUDE_EXTENSIONS 0x2
Specifies whether the extensions should be included in this serialization.

INCLUDE_OUTGOING_LINKS 0x4
Specifies whether the outgoing links should be included in this serialization.

INCLUDE_EMBEDDED 0x8
Specifies whether all the items in the compound item should be included in this serialization.

INCLUDE_SECURITY_DESCRIPTOR 0x10
Specifies whether the explicit access control list (ACL) on the item should be included.

INCLUDE_SYNC_METADATA 0x80
Include the sync metadata required for non-authoritative restore.

INCLUDE_SCHEMA_METADATA 0x100
Specifies whether schema metadata required to de-serialize this item must be included in this serialization. In case a large number of items are being serialized, an application can choose to back that up separately from the individual item serializations.

INLINE_BACKING_FILE 0x200
Specify whether the backing file is inlined in the serialization or only a UNC path of the file is part of the serialization. This also includes the attributes of the backing file (hidden, read only etc.) and the time stamps.

Examples of valid serialize data options using these exemplary options include:

SERIALIZE_FOR_COPY|INCLUDE_IDs
This option produces a serialization of the item, customized for copy and also including the ids.

SERIALIZE_FOR_BACKUP|INCLUDE_IDs
This is a valid option, however by specifying the option, SERIALIZE_FOR_BACKUP. INCLUDE_IDs is automatically on and separately specifying it is redundant.

INCLUDE_IDs|INCLUDE_OUTGOING_LINKS
This produces a serialization of the core item and its extensions retaining the item id in the serialization. It is valid in this example to not specify any of the common use cases.

Examples of invalid serialize data options using these exemplary options include:

SERIALIZE_FOR_COPY|SERIALIZE_FOR_BACKUP
It is not valid to specify more than one default in this example.

Figure 5:
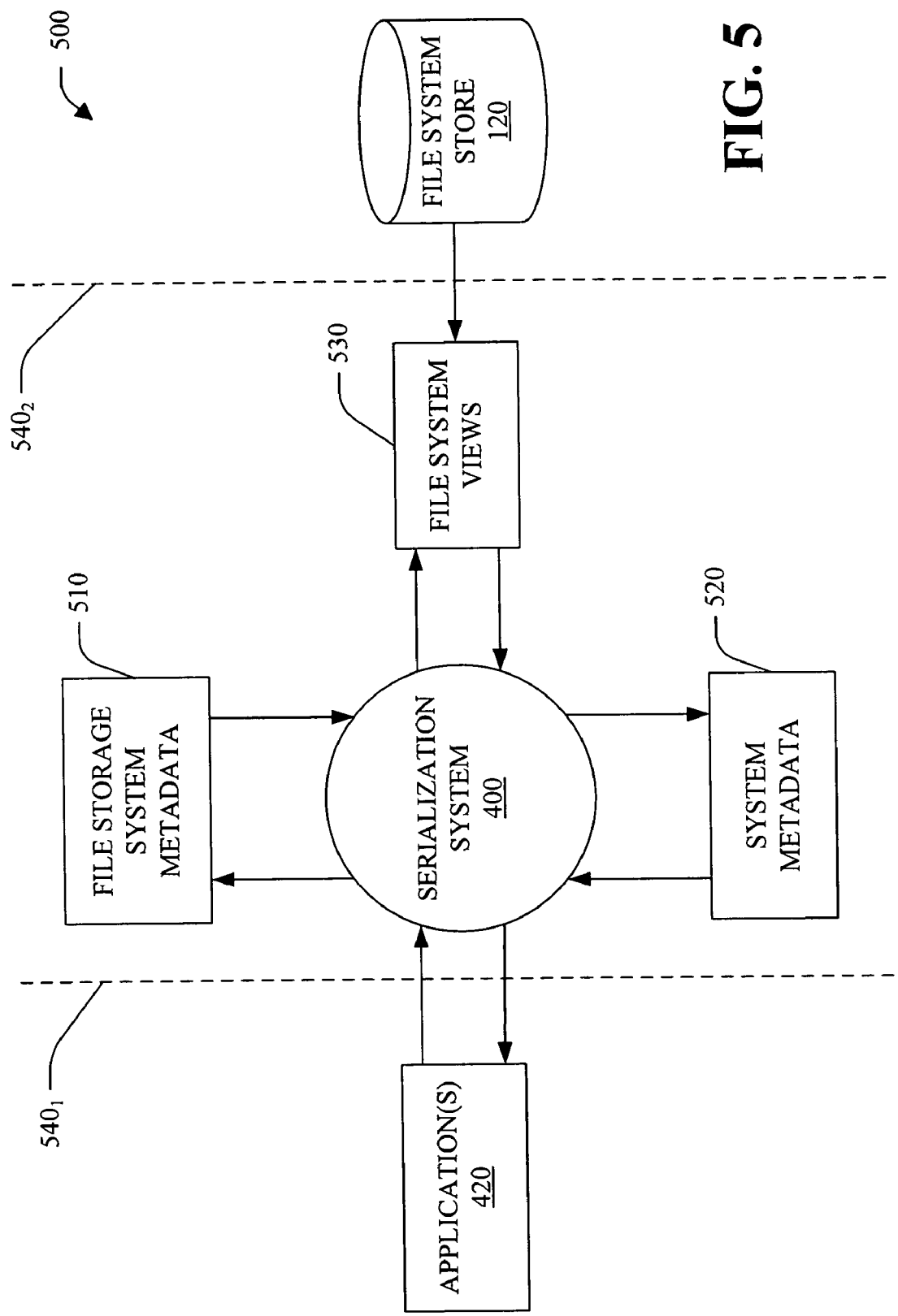
FIG. 5 is a block diagram of a serialization environment in accordance with an aspect of the subject invention.

SERIALIZE_FOR_COPY & !INCLUDE_EXTENSIONS
In this example, 'and' combinations are not permitted. In order to achieve the above, the options must be specified using explicit or combination of individual options as follows:
INCLUDE
OUTGOING_LINKS|INCLUDE_EMBEDDED|
INLINE_FILESTREAM_ATTRIBUTES|
INCLUDE_SCHEMA_METADATA Common Use Cases These options define the item boundary for the most common use scenarios. For example:

SERIALIZE_FOR_COPY 0x10000000
When this option is selected, the following options are turned on.
INCLUDE_EXTENSIONS,
INCLUDE_OUTGOING_LINKS,
INCLUDE_EMBEDDED,
INCLUDE_SECURITY_DESCRIPTOR,
INLINE_FILESTREAM_ATTRIBUTES and
INCLUDE_SCHEMA_METADATA SERIALIZE_FOR_BACKUP 0x20000000
When this option is selected, the following options are turned on.
INCLUDE_EXTENSIONS,
INCLUDE_OUTGOING_LINKS,
INCLUDE_EMBEDDED,
INLINE_FILESTREAM_ATTRIBUTES,
INCLUDE_SECURITY_DESCRIPTOR,
INCLUDE_SCHEMA_METADATA
INCLUDE_IDs and
INCLUDE_SYNC_METADATA Turning to FIG. 5, a serialization environment 500 in accordance with an aspect of the subject invention is illustrated. Application(s) 420 provide information associated with an item to be serialized, for example, an ItemID to the serialization system 400. Thereafter, the serialization system 400 obtains type information regarding the ItemID from a file store system metadata 510. Employing the ItemID and the type information, the serialization component 400 query(ies) (e.g., recursively) the file system views 530 for information associated with the item (e.g., the item and associated entity(ies)) to be serialized as discussed previously.

In one example, the serialization component 130 does not support random access for item fragments. In this example, the item fragment can be sequentially accessed (e.g., in a linked-list fashion) using the starting offset from the header and the length field preceding each fragment.

Items in a Compound Item

When the INCLUDE_EMBEDDED option is chosen, the system 400 recursively walks through the items in the compound item and serializes them. For example, the system 400 can perform multiple queries to walk the recursive structure and serialize each item. The resulting serialization has a recursive structure where embedded item serializations are included in their parent's serialization.

In one example, each item in a compound item can have a different security descriptor. Thus, it is possible that the caller of the serialize API does not have access to all the items in a compound item. In this example, in the situation in which the user does not have access to all the items, items to which the caller does not have access are not serialized.

Backing File

In this example, the backing file may either be inline into the serialization or copied separately by the caller (e.g., based upon serialize option(s)).

Backing File Inline

When the application has requested file back item(s) to be included in the serialization, the backing file can be read from the file storage system 120. In addition to the file, attribute(s), creation, last access and/or modification times can also be included in the serialization header. For example, this information can be employed when the item is being serialized for backup (e.g., where it is required to restore time stamps to their original value upon de-serialization).

Backing File Not Inlined

In this situation, the application has not requested file back item(s) to be included in the serialization, for example, by not setting the INLINE_BACKING_FILE option while calling the serialize API. In this example, the serialize API can embed the file name in the header instead of including the contents of the file in the serialization. Accordingly, the application can read this file name and can handle the contents of the backing file using the file storage system API directly. However, in this case as well the file attributes and the creation, last access and modification timestamps can be captured in the serialization header For example this information can be when the item is being serialized for backup (e.g., where it is required to restore time stamps to their original value upon de-serialization).

Schema Metadata

In this example, the schema metadata is captured along with each entity serialization as it contains typeId's that can be unique to the file system store 120. The typeId to assembly name and version mapping is the schema metadata that is required to de-serialize a user-defined type serialization. For example, there can be schema metadata associated with each entity (e.g., item, link, extension and/or fragment) and it can be included with the respective entity serialization.

In order to obtain this information, the serialization system 400 can query the system metadata 520 to obtain a fully qualified type name. For example, GetNameFromTypeId returns the fully qualified type name given a TypeId as a table with exactly one row of two columns containing the SchemaName and TypeName respectively. The TypeId from the respective item/link/extensionIfragment table of the file system store 120 can be employed as a input to the function to obtain the schemaname and the type name. This can further be joined with the sys.assemblies table to get the fully qualified type name. Generally, the TypeIds are not unique across file system store(s) 130 (e.g., databases) however the fully qualified type names are unique. For in-store copies (e.g., where the type-ids are the same at source and target), the schema metadata can be excluded.

Security

As discussed previously, each item can have a security descriptor associated with it identifying user(s) can access the item and/or user(s) that cannot access them. Continuing with the example discussed with respect to FIG. 5, exemplary trust boundaries 540 are identified. In this example, the environment 500 can rely upon file system authorization to ensure that the user has permission to connect to the file system store 120. The caller of the particular serialize or de-serialize API generally has established a connection with the file system store 120 before calling the API.

Figure 6:
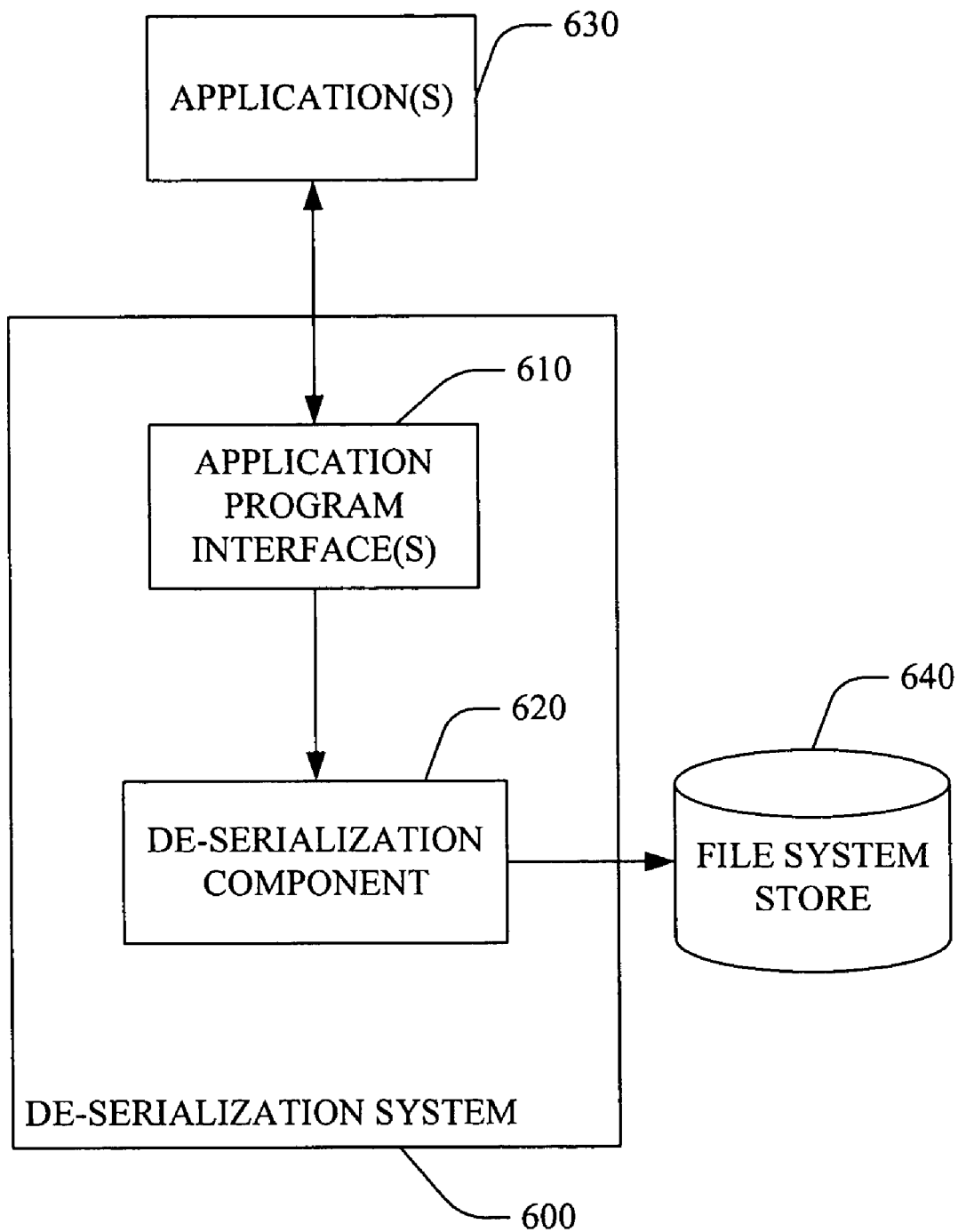
FIG. 6 is a block diagram of a de-serialization system in accordance with an aspect of the subject invention.

Turning next to FIG. 6, a de-serialization system 600 in accordance with an aspect of the subject invention is illustrated. The system 600 can be employed to de-serialize an item and it's associated entity(ies), for example, generated by the system 100 and/or system 400. The system 600 can employ a header to gain random access to the item and associated entity(ies) (e.g., can interpret/parse only the parts in which it is interested).

The system 600 can expose application program interface(s) (API's) 610 that facilitate the de-serialization of the item and it's associated entity(ies). The APIs 610 can provide the serialized item to a de-serialization component 620, for example, received from application(s) 630. The de-serialization component 620 re-creates the item structure and stores it in a file system store 640.

After receiving a request to de-serialize an item from an application 630, the API 610 provides the serialized item to the de-serialization component 620, the de-serialization component 620 can use the header offset as described above to read the header (e.g., into memory) and employ the header through the de-serialize process. In one example, the de-serialize component 620 can then:

1. De-serialize the core item
2. De-serialize the item fragments
3. De-serialize the outgoing links
4. De-serialize the extensions
5. De-serialize the items embedded in a compound item container, for example, recursively, traversing the tree top down
6. De-serialize the backing File The de-serialized item and associated entity(ies) are stored in the file system store 640.

Link Fix Up

In one example, during de-serialization, the system 600 ensures that all the relationships of the items that existed in the serialization continue to exist once the items are de-serialized. Furthermore, since incoming link information is serialized, serialization will also fix up the incoming links to the items that were de-serialized. This is to ensure that what was serialized is the same (e.g., exactly) after it is de-serialized.

For example, the scope of the fix up work can be all the items in a given copy operation. As discussed below, a user of the serialization API can create a batch scope by invoking two helper APIs BeginDeserializationBatch & EndDeserializationBatch. Any items de-serialized inside of this scope will have their links fixed up to other items in this scope. For example, a temporary table can be employed to keep track of the IDs for the relationships of the items as they are de-serialized. This temporary table then maps the old IDs to the new IDs and serialization then fixes target IDs and source IDs of links. In this example, links (within the batch) and containment relationships can be fixed.

This can be implemented, for example, as an extra flag for DeserializeItem. However, one example, the consumer of the Serialization APIs is required to explicitly state the beginning and end of the batch.

APIs

The APIs 610 facilitate communication between the system 600 and application(s) 630. For example, the APIs 410 can facilitate de-serialization of a serialized item. The APIs 610 can be exposed at the file system level and/or at the store procedure level. Exemplary APIs 610 are discussed below:

De-serialize Item API

The De-serialize Item API de-serializes an item and places it in a container with the id specified as the containerid. If both the namespace name and the container id are passed as null, then their values are taken from the serialization. The stored procedure de-serializes the item in the same container that the item was when it was serialized. For example, this can be desired in scenarios such as copying an entire tree (e.g., folders and sub-folders) from source to destination while retaining the item ids. In this example, the container id cannot be passed as null if the serialization does not include the item ids (e.g., doing so will result in an error). For example:

[System.Storage.Serialization].DeserializeItem (
@serialization varbinary (max),
@containerId uniqueidentifier,
@namespacename nvarchar(255),
@options int,
@itemid uniqueidentifier output)
@fileinfolist FileInfoList output where serialization refers to the serialized item (e.g., that was produced as result of an earlier serialization); containerId refers to the ItemId of the container which is to contain the new Item; namespacename refers to the namespace name of the item that is de-serialized; options refers to the options that govern the behavior of de-serialize process (discussed below); itemid refers to the ItemId of the new Item; and, fileinfolist is a list of the file name, item id and size of the files contained in this item. For example:

```
Class FileInfoList: ArrayList;
// It will contains instances of:
Class FileInfo {
SqlGuid itemId;
SqlString relativePath;
SqlBigint      size;
}
```

De-serialize with Overwriting Existing Item

This API 610 de-serializes and overwrites an existing item in the store with the contents of the given serialization. In this example, when overwriting a file backed item, the backing file is truncated. If the serialization does not have the file inline, then this operation results in a backing file of zero length.

Further, in this example, this API 610 can only be used when restoring the same item to a state in the past. For example:

```
[System.Storage.Serialization].DeserializeItemReplace (
@serialization varbinary (max),
@targetitemid uniqueidentifier,
@options int)
``` where serialization refers to the serialized item (e.g., that was produced as result of an earlier serialization); targetitemid refers to the ItemId of the Item that is to be replaced; and, options refers to the options that govern the behavior of de-serialize process (discussed below).

De-serialize Item from File

This API 610 can be provided to allow de-serializing of large items from a file (e.g., produced by the system 100 and/or the system 400). For example, the file can be produced by the SerializeItemToFile API, discussed above, and/or by invocation of the SerializeItem API, discussed above, with subsequent writing of the item serialization to the file. In this example, if both the namespace name and the container id are passed as null, then their values are taken from the serialization. For example:

```
[System.Storage.Serialization].DeserializeItemFromFile (
@filename nvarchar (1024),
@containerId uniqueidentifier,
@namespacename nvarchar(255),
@options int,
@itemid uniqueidentifier output,
@fileinfolist FileInfoList output
``` where filename refers to the name of the file that has the serialization of the item to be de-serialized; containerId refers to the ItemId of the container which is to contain the new Item; namespacename refers to the namespace name of the item that is de-serialized; options refers to the options that govern the behavior of de-serialize process (discussed below); itemid refers to the ItemId of the new Item and, fileinfolist is a list of the file name, item id and size of the files contained in this item. For example:

```
Class FileInfoList: ArrayList;
// It will contains instances of:
Class FileInfo {
SqlGuid itemId;
SqlString relativePath;
SqlBigint      size;
}
```

De-serialize with Overwriting Existing Item from File

The Deserialize with Overwriting existing item from file API 610 overwrites an existing item in the file system store 640 with the contents of the given item serialization contained in the file specified (e.g., created by SerializeItemToFile API discussed above and/or by invocation of SerializeItem API with the item serialization subsequently written to the file). In this example, when overwriting a file-backed item, the backing file is truncated. If the serialization does not have the file inline, then this operation results in a backing file of zero length.

In this example, DeserializeItemReplaceFromFile can only be used when restoring the same item to a state in the past. For example,

```
[System.Storage.Serialization].De-serializeItemReplaceFromFile (
@filename nvarchar (1024),
@fileoffset bigint,
@targetitemid uniqueidentifier,
@options int,
@bytesread bigint output
``` where filename is the name of the file that has the serialization of the item to be de-serialized; targetitemid is the ItemId of the Item that is to be replaced; targetitemid is the itemid of the item that is to be replace; options refers to the options that govern the behavior of de-serialize process (discussed below); and, bytesread returns the number of bytes read (e.g., to facilitate jumping to next offset).

BeginDeserializationBatch & EndDeserializationBatch

These helper functions can be used in conjunction with each other and the Link_Fix_Up deserialization option (discussed below). Calling BeginDeserializationBatch starts a deserialization batch scope. In this example, all items serialized in this scope will have all their links corrected so that they will continue to work. After all items have been deserialized EndDeserializationBatch is then called to end the scope and clean up the temporary table used by this operation.

For example, ItemA links to ItemB that links to ItemC. Further, these items are being deserialized to a new store. In this example, the client application makes the following calls:

Begin DeserializationBatch( ) (create temp table to track all the links)

Deserialize all itemswith Link Fixup flag

End DeSerializationBatch( )

Even though the items have been recreated in this new store and have new ItemIDs, they can be correctly linked together because of a fix up flag.

De-serialize Options

Exemplary de-serialization options include:

RETAIN_ITEM ID 0x1

Retain the same itemid as of the serialized item. This is only applicable if the ItemID is not nulled out.

RESTORE_SECURITY_DESCRIPTOR 0x2
  Retain the same explicit access control list (ACL) as of the serialized item.
RESTORE_TIME_STAMP 0x4
  Restores the local creation time and modification time (e.g. applicable to copy and/or restore).
RESTORE_SYNC_METADATA 0x8
  Restores _ChangeInformation, SyncMetadata for the items. In case of Replica/Mapping/Conflict items, they are restored only if this option is specified.
LINK_FIX_UP 0x10
  The Link_Fix_Up option can be employed in conjunction with two helper APIs BeginSerializationBatch & EndSerializationBatch to ensure that all the items links are preserved. In one example, if Link_Fix_Up is used outside of a batch scope, that call fails.

Using User-Defined Types in De-serialization

Reconstruction of user-defined type(s) (UDTs) by the de-serialization component 620 can be performed: (1) to verify whether the serialization is a valid serialization; and, (2) to verify that the types required for de-serializing the item are present in the system; and/or, (3) to trigger validation constraint(s). In this example, reconstruction of UDTs from the serialization is performed prior to de-serialization of the core item.

Figure 7:
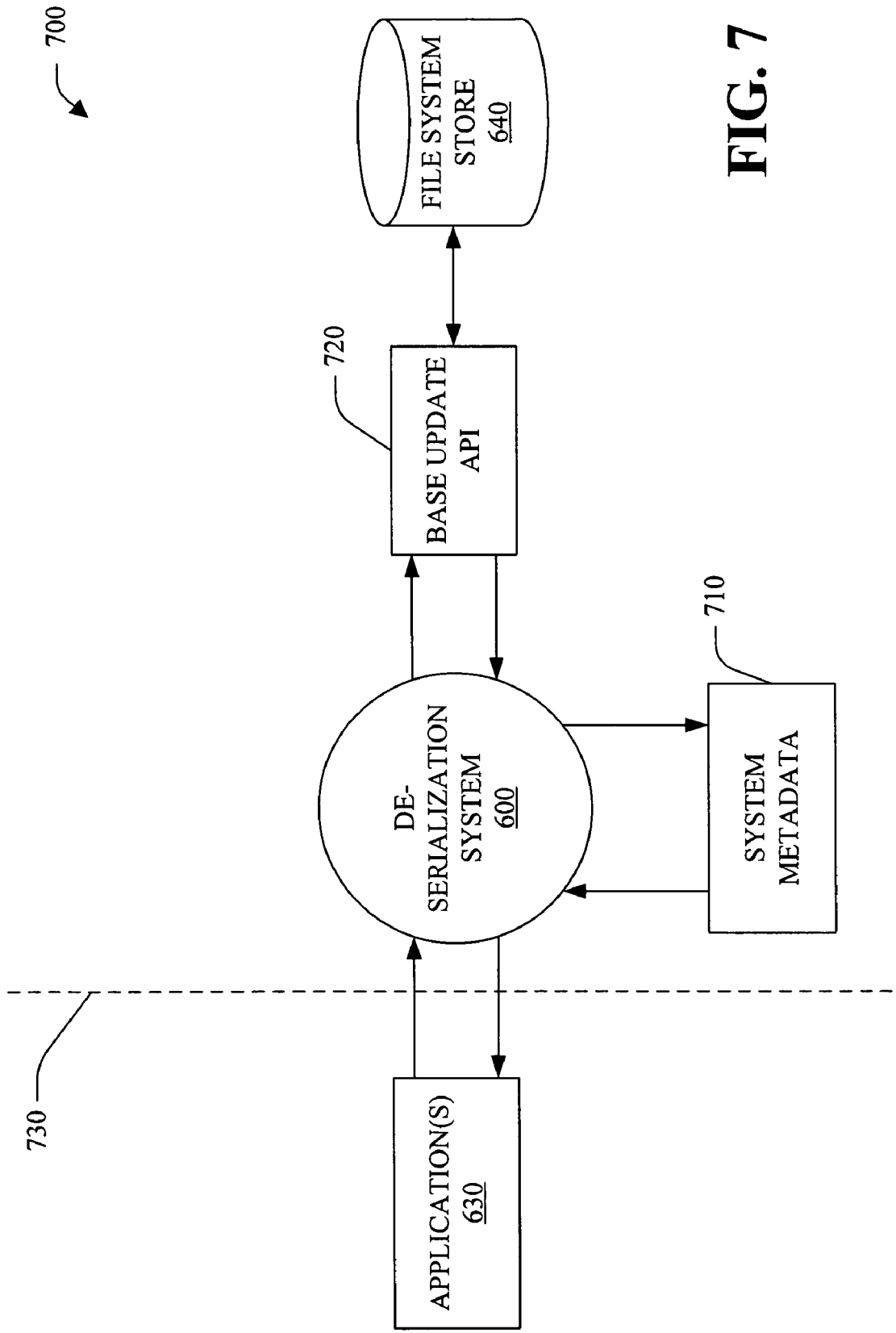
FIG. 7 is a block diagram of a de-serialization environment in accordance with an aspect of the subject invention.

Referring next to FIG. 7, a de-serialization environment 700 in accordance with an aspect of the subject invention is illustrated. The environment 700 includes a de-serialization system 600 which interfaces with a file system store 640 via a base update API 720. An exemplary trust boundary 730 is further identified. As discussed above, the caller of the particular de-serialize API generally has established a connection with the file system store 640 before calling the API.

For example, an application 630 can provide an item serialization to the de-serialization system 600. The de-serialize system 600 can obtain information regarding user-defined types from the system metadata 710, as discussed previously. Through the base update API 740, the de-serialization system 600 can attempt to store the de-serialized core item and associated entity(ies). The base update API 720 can include, for example:

CreateItem
  The de-serialization system 600 can use this base update API 720 to create the de-serialized item in the file system store 640. For example, this base update API 720 can be employed when creating an item without overwrite.

SetItemSecurity
  This base update API 720 can be employed to set the security descriptor of the Item that was de-serialized. For example, the following policy can be employed while setting the security descriptor:
  When the de-serialize system 600 does not specify the restore semantics, SetItemSecurity is used to set the access control list alone.
  When restore semantics are specified, SetItemSecurity can be employed to set both the access control list and the group and the owner.

ReplaceItem
  The de-serialization system 600 can call this base update API 720 to overwrite an existing item with the de-serialized item in the file system store 640. For example, this base update API 720 can be employed when creating an item with overwrite.

MoveItem
  This base update API 720 can be used to move the item to be replaced so that it has the same container and the same namespace name as it did when it was serialized.

CreateLink
  The de-serialization system 600 can employ this base update API 720 to de-serialize out-going link(s) of the item in the file system store 640.

CreateExtension
  This base update API 720 can be used to de-serialize extensions of the item in the file system store 640.

CreateItemFragment
  The de-serialization system 600 can use this base update API 720 to de-serialize fragments of the item in the file system store 640.

UpdateLink
  This base update API 720 can be employed by the de-serialization system 600 to update the target-item id of links which are incoming links for the item that was created, as discussed below.

Replacing Items that Have Moved

Replacing an item during de-serialize with its copy in the past can be a common occurrence during a restore. Significantly, the item that has been restored could have moved between the time it was serialized (e.g., backed up) and de-serialized (e.g., restored). Move is a general operation that refers to one of the following:
  a) Change the parent container,
  b) Change the namespace name, and/or
  c) Change both the namespace name and parent container
In this example, when the item is restored, the replace operation cannot change the namespace name or the containerid. Therefore to restore the item to its original location, MoveItem is used to have the same container and the same namespace name (if either of them had changed) and then perform the replace.

Replacing Compound Items

In this example, when DeserializeItemReplace is called on a compound item (e.g., replacing compound item with its copy in the past) the following occurs:
  1) The root item is moved to its original location, its namespace name is restored to its old value and replaced with the item in the serialization;
  2) Items that were added to the compound item tree since it was serialized (e.g., backed up) are deleted;
  3) Items that were deleted from the compound item since it was serialized are created as a part of the de-serialize process using CreateItem; and,
  4) Items that have not been deleted since the last serialize are replaced using ReplaceItem Handling Incoming Links for the Item Being De-serialized In one example, during a restore operation (e.g., when item ids have been retained in the environment 700), the following can be employed to fix the target item ids for the links incoming to the item:
  For each incoming link id:
    a. Check if the link with the link id exists in the store. If it does then follow next step else skip the next step
    b. Use UpdateLink API 720 to update the target-item id of these links to the id of the item that was de-serialized.
    c. Repeat the above two steps for all the incoming link ids.

De-serializing File Backed Items

File Inline in the Serialization
  When the file is inline in the serialization, in one example, the header can carry the following information, the item id of the file backed item (from which the path to which the file is to be written can be deduced) and the portion of the serialization that contains the backing file. This can be employed to write the file/files to the designated location using the base update API 720.

File Not Inline in the Serialization

In this example, when the file is not inline in the serialization, it is the responsibility of the caller to use the base update API 720 to copy the backing file to the target location.

It is to be appreciated that the system 100, the file system store 120, the system 400, the APIs 410, the application(s) 420, the system 500, the file storage system metadata 510, the system metadata 520, the file system views 530, the environment 600, the APIs 610, the de-serialization component 620, the application(s) 630, the file system store 640, the environment 700, the system metadata 710 and/or the base update API 720 can be computer components as that term is defined herein.

Turning briefly to FIGS. 8-11, methodologies that may be implemented in accordance with the subject invention are illustrated. While, for purposes of simplicity of explanation, the methodologies are shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodologies in accordance with the subject invention.

The subject invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 8:
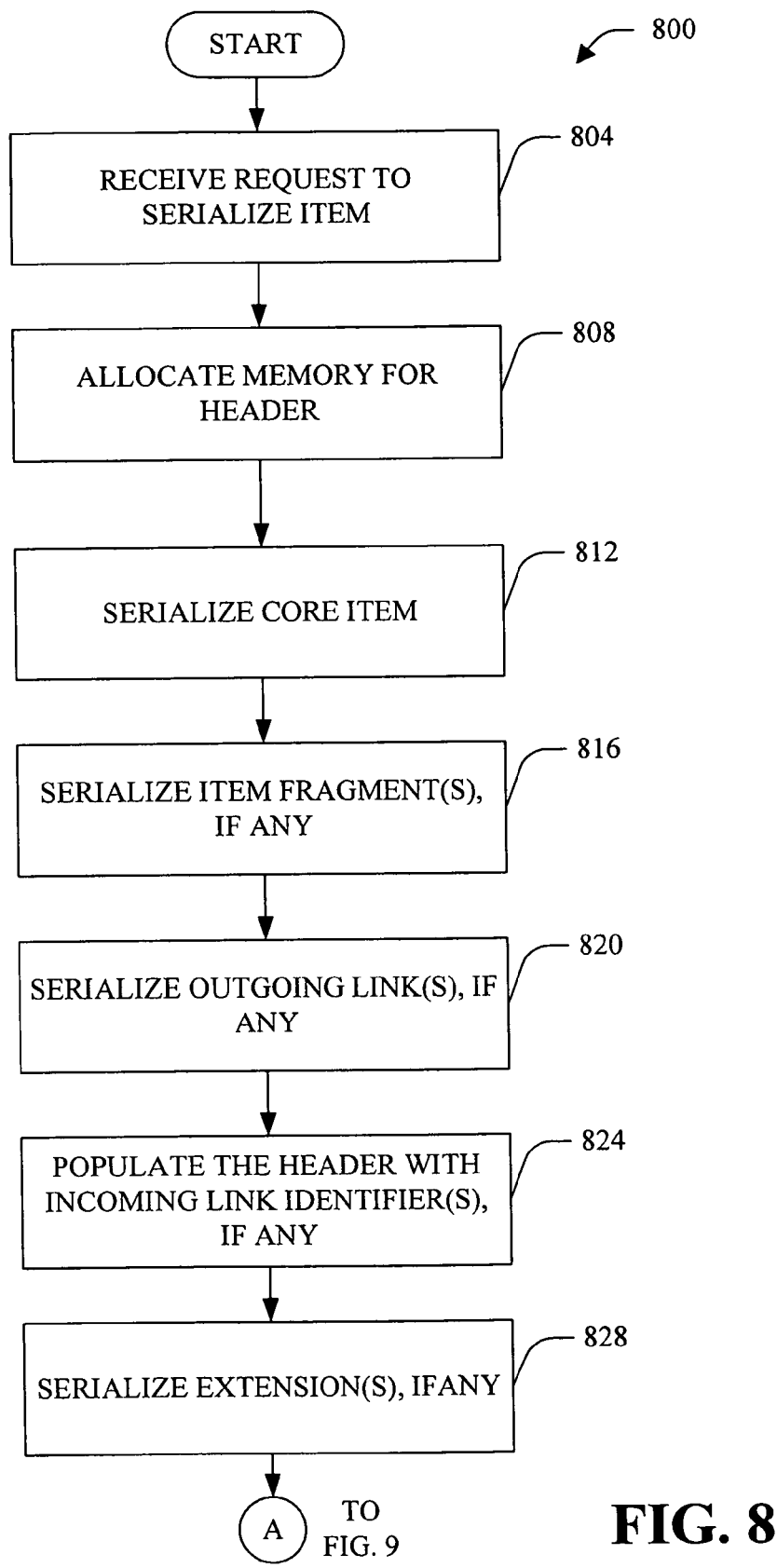
FIG. 8 is a flow chart of a method facilitating serialization of an item in accordance with an aspect of the subject invention.
Figure 9:
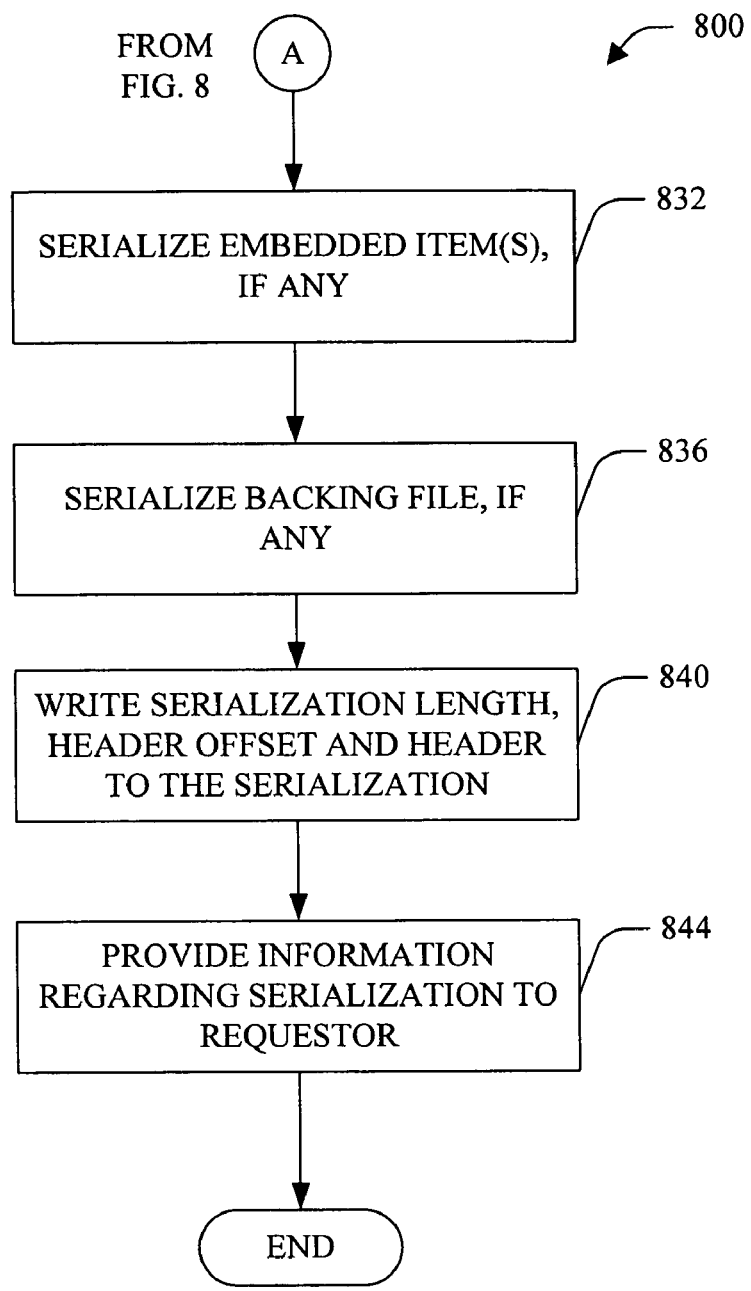
FIG. 9 is a flow chart further illustrating the method of FIG. 8.

Referring to FIGS. 8 and 9, a method facilitating serialization of an item 800 in accordance with an aspect of the subject invention is illustrated. At 804, a request to serialize an item is received (e.g., from an application). At 808, memory is allocated for a header. At 812, a core item is serialized.

At 816, item fragment(s), if any are serialized. Next, at 820, outgoing link(s), if any, are serialized. At 824, incoming link(s) identifiers, if any, are populated in the header. At 828, extension(s), if any, are serialized. At 832, embedded item(s), if any, are serialized. At 836, a backing file, if any, is serialized. At 840, a serialization length, header offset and header are written to the serialization. At 844, information regarding the serialization is provided to the requester (e.g., requesting application). For example, the serialization itself can be provided to the requesting application. Alternatively, a pointer to the serialization and/or a file name of the serialization can be provided to the requesting application.

Figure 10:
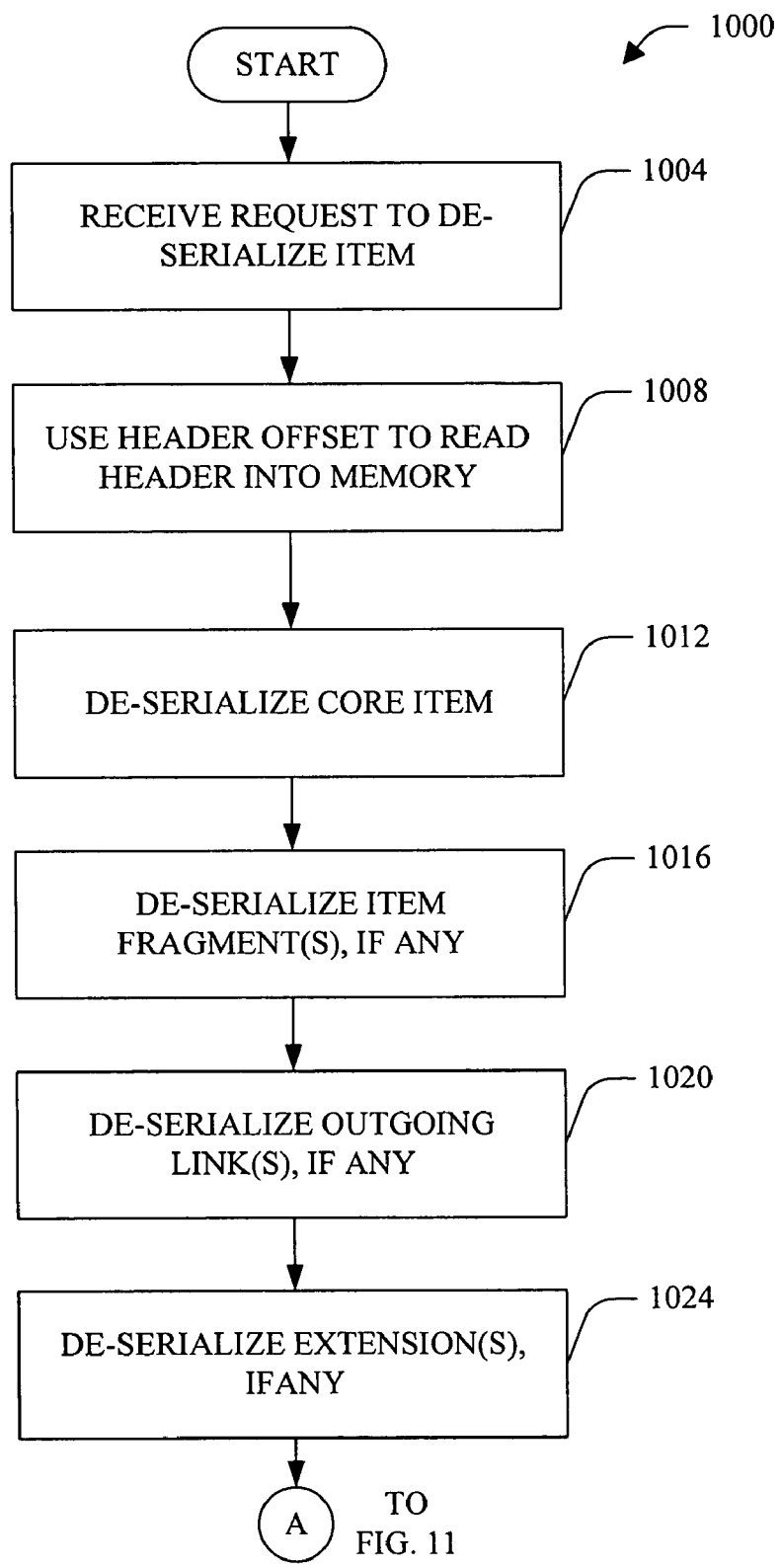
FIG. 10 is a flow chart of a method facilitating de-serialization of an item in accordance with an aspect of the subject invention.
Figure 11:
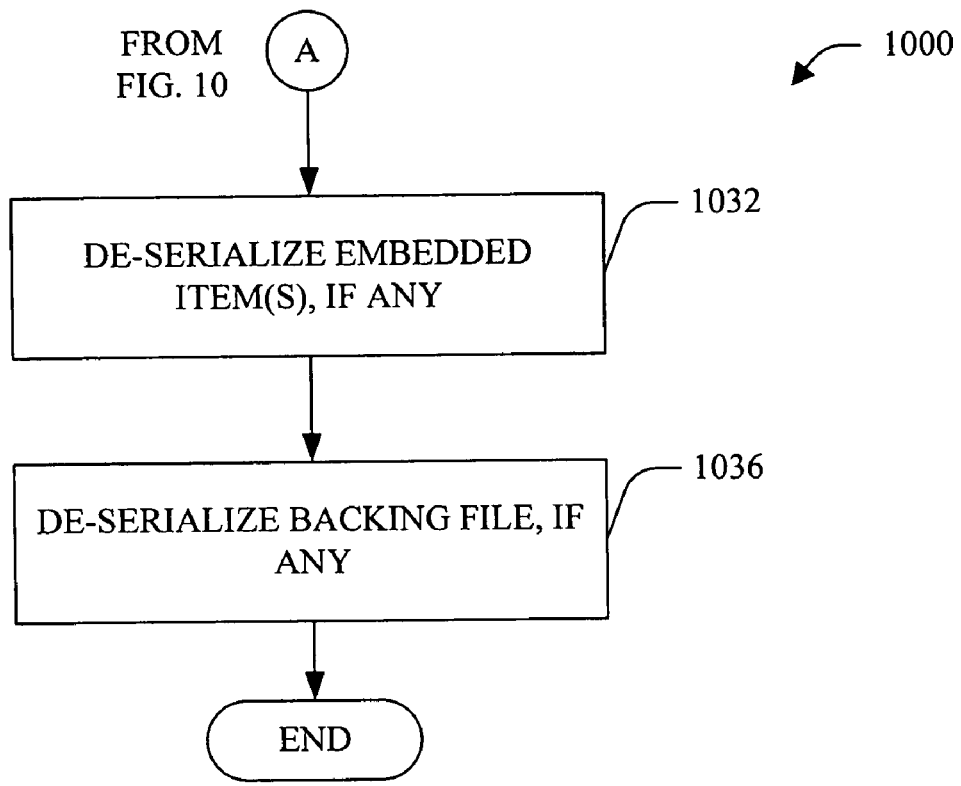
FIG. 11 is a flow chart further illustrating the method of FIG. 10.

Next, turning to FIGS. 10 and 11, a method facilitating de-serialization of an item 1000 in accordance with an aspect of the subject invention is illustrated. At 1004, a request to de-serialize an item is received. At 1008, a header offset is used to read a header into memory. At 1012, a core item is de-serialized. At 1016, item fragment(s), if any, are de-serialized. At 1020, outgoing link(s), if any are de-serialized.

At 1024, extension(s), if any, are de-serialized. At 1032, embedded item(s), if any, are de-serialized. At 1036, a backing file, if any, is de-serialized. The de-serialized item and associated entity can be stored in a file storage system.

Figure 12:
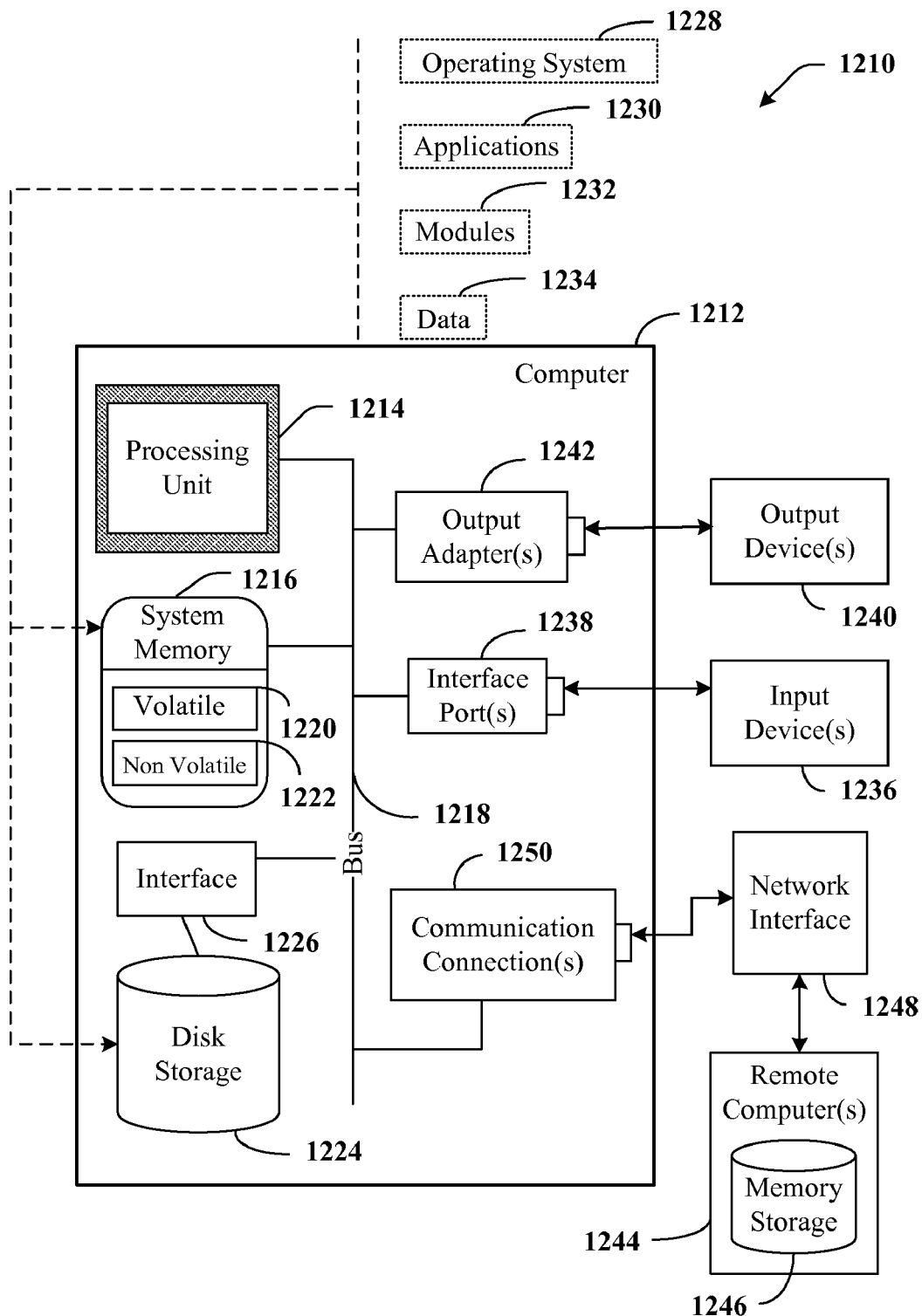
FIG. 12 illustrates an example operating environment in which the invention may function.

In order to provide additional context for various aspects of the subject invention, FIG. 12 and the following discussion are intended to provide a brief, general description of a suitable operating environment 1210 in which various aspects of the subject invention may be implemented. While the subject invention is described in the general context of computer-executable instructions, such as program modules, executed by one or more computers or other devices, those skilled in the art will recognize that the subject invention can also be implemented in combination with other program modules and/or as a combination of hardware and software. Generally, however, program modules include routines, programs, objects, components, data structures, etc. that perform particular tasks or implement particular data types. The operating environment 1210 is only one example of a suitable operating environment and is not intended to suggest any limitation as to the scope of use or functionality of the subject invention. Other well known computer systems, environments, and/or configurations that may be suitable for use with the subject invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 12, an exemplary environment 1210 for implementing various aspects of the subject invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/nonremovable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented serialization system that serializes file system items and associated entities of the file system items to generate a serialization stream, the serialization system comprising—a processor and one or more physical computer readable storage media operatively coupled to the processor, the computer readable storage media having stored thereon computer executable instructions that, when executed by the processor, implement the following components:

an identification component that generates identification information identifying a file system item from within a file system store, the file system item including one or more properties that further define the file system item, the identification information also identifying associated entities of the file system item, the associated entities including:

an embedded item that comprises at least a second file system item;

an extension that extends the file system item with at least one additional property;

an item fragment that identifies the file system item as part of a collection;

a backing file from which at least a part of the file system item is promoted; and a serialization component that employs a serialization option to select a subset of the associated entities to include as part of a serialization stream, and, in response to receiving the identification information from the identification component, serializes the file system item and the subset of the associated entities to generate the serialization stream, the serialization stream including:

a serialized serialization length that specifies a length of the serialization stream;

a serialized file system item;

a serialized subset of the associated entities;

a serialized header that includes serialization information associated with the file system item and the subset of the associated entries, wherein the serialized header is generated by the serialization component and facilitates random access to the file system item and the subset of the associated entities; and a serialized header offset to the header and which identifies a location of the serialized header within the serialization stream.

2. The computer-implemented serialization system of claim 1, wherein the associated entities further include at least one of an outgoing link that identifies the file system item as a source and that couples the file system item and at least a third file system item, and an incoming link that identifies at least a fourth file system item as a source and that couples the file system item and the fourth file system item.

3. The computer-implemented serialization system of claim 1, wherein initiation of serialization of the file system item and associated entities is based upon a request.

4. The computer-implemented serialization system of claim 3, wherein identification of the associated entities is based, at least in part, upon security information associated with a context associated with the request.

5. The computer-implemented serialization system of claim 4, wherein identification of the associated entities is further based upon an access control list associated with the associated entities.

6. The computer-implemented serialization system of claim 1, further comprising an application program interface that facilitates communication between the serialization system and an application associated with serialization of the file system item.

7. The computer-implemented serialization system of claim 6, wherein the application program interface facilitates at least one of export, backup, restore and copy of the file system item and the associated entities.

8. The computer-implemented serialization system of claim 6, wherein the application program interface is exposed at a file system level.

9. The computer-implemented serialization system of claim 6, wherein the application program interface is exposed at a stored procedure level.

10. The computer-implemented serialization system of claim 6, wherein the application program interface returns the serialization stream in a byte array.

11. The computer-implemented serialization system of claim 6, wherein the application program interface returns a pointer or file name associated with the serialization stream.

12. The computer-implemented serialization system of claim 1, wherein the serialization system component further recursively serializes the embedded item, including any associated entities of the second file system item.

13. A method implemented by a computing system that includes a processor and memory storing instructions which, when executed by the processor, implement the method of capturing a consistent copy of associated entities of a file system item serialized into a serialization stream, the computer-implemented method comprising, acts of:
  serializing the file system item, the file system item within a file system store and including one or more properties that further define the file system item;
  identifying associated entities of the file system item the associated entities including:
    an embedded item that comprises at least a second file system item;
    an extension that extends the file system item with at least one additional property;
    an item fragment that identifies the file system item as part of a collection; and
    a backing file from which at least a part of the file system item is promoted;
  selecting a subset of the identified associated entities to include as part of a serialization stream based on a serialization option;
  generating header that includes serialization information associated with the file system item and the subset of the associated entities, wherein the header facilitates random access to the file system item and the subset of the associated entities;
  serializing at least the subset of the associated entities, and the header, a serialization length that specifies a length of the serialization stream, and a header offset to the header which identifies a location of the header within the serialization stream; and
  generating the serialization stream that includes the serialized serialization length, the serialized file system item, the serialized subset of the associated entities, the serialized header, and the serialized header offset.

14. The method of claim 13 further comprising: receiving a request to serialize the file system item.

15. The method of claim 13, wherein the associated entities further include at least one of an outgoing link; that identifies the file system item as a source and that couples the file system item and at least a third file system item, and an incoming link that identifies at least a fourth file system item as a source and that couples the file system item and the fourth file system item.

16. A computer program product comprising one or more physical computer readable storage media having stored thereon computer executable instructions that, when executed by a processor, perform the method comprising of:
  serializing the file system item, the file system item within a file system store and including one or more properties that further define the file system item;
  identifying associated entities of the file system item the associated entities including:
    an embedded item that comprises at least a second file system item;
    an extension that extends the file system item with at least one additional property;
    an item fragment that identifies the file system item as part of a collection; and
    a backing file from which at least a part of the file system item is promoted;
  selecting a subset of the identified associated entities to include as part of a serialization stream based on a serialization option;
  generating header that includes serialization information associated with the file system item and the subset of the associated entities, wherein the header facilitates random access to the file system item and the subset of the associated entities;
  serializing at least the subset of the associated entities, and the header, a serialization length that specifies a length of the serialization stream, and a header offset to the header which identifies a location of the header within the serialization stream; and
  generating the serialization stream that includes the serialized serialization length, the serialized file system item, the serialized subset of the associated entities, the serialized header, and the serialized header offset.

17. The computer-implemented serialization system of claim 12, wherein the second file system item and any associated entities of the second file system item are each associated with corresponding security descriptors that identify access permissions to the second file system item or the associated entities, and wherein the serialization component recursively serializes the second file system item and the associated entities only when a security descriptor grants access permission to the second file system item or the associated entities.

* * * * *